United States Patent

[11] 3,543,940

| [72] | Inventor | Henry Schmidt, Jr.<br>Hinsdale, Illinois |
|------|----------|------------------------------------------|
| [21] | Appl. No. | 752,709 |
| [22] | Filed | Aug. 14, 1968 |
| [45] | Patented | Dec. 1, 1970 |
| [73] | Assignee | Industrial Filter and Pump Mfg. Co.<br>Cicero, Illinois<br>a corporation of Illinois |

[54] FILTER CONSTRUCTION
9 Claims, 5 Drawing Figs.

[52] U.S. Cl. .................................................. 210/490,
210/493, 210/501, 210/507
[51] Int. Cl. ........................................................ B01d 27/06
[50] Field of Search .................................................. 210/484,
489, 490, 491, 492, 493, 501, 507, 499, 496

[56] References Cited
UNITED STATES PATENTS

| 2,675,127 | 4/1954 | Larte | 210/493 |
| 2,771,118 | 11/1956 | Bobkowicz | 210/496UX |
| 3,042,216 | 7/1962 | Goldman | 210/489X |
| 3,115,459 | 12/1963 | Giesse | 210/493X |
| 3,209,916 | 10/1965 | May et al. | 210/489X |
| 3,260,370 | 12/1966 | Schwartzwalder | 210/489 |
| 3,448,862 | 6/1969 | Kudlaty | 210/489 |

Primary Examiner—John Adee
Attorney—Fidler, Bradley, Patnaude & Lazo

ABSTRACT: A cleanable, reusable filter medium includes a thermoplastic netting bonded throughout its surface area to a thin, porous, nonwoven fabric formed of synthetic or natural fibers. The medium has application in pleated type tubular filter elements and eliminates the need for the usual center tube.

Patented Dec. 1, 1970
3,543,940
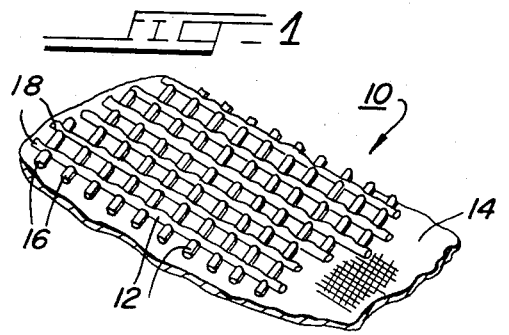
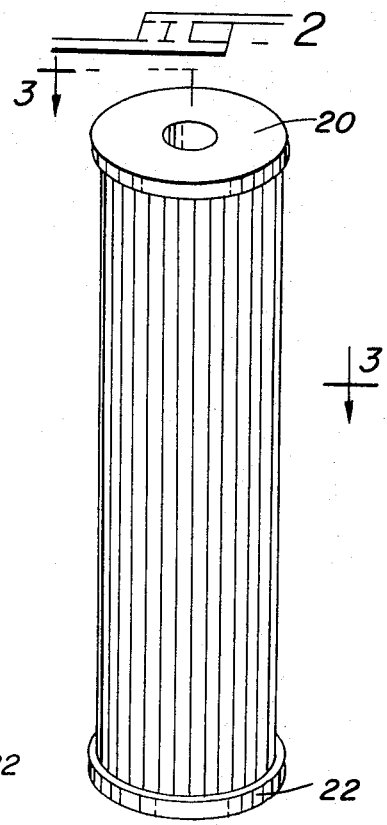
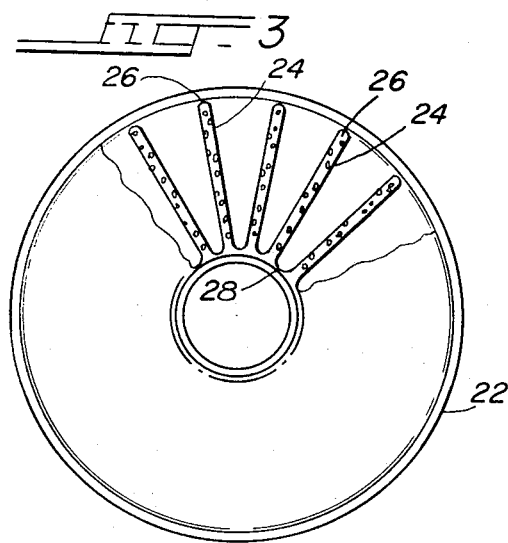
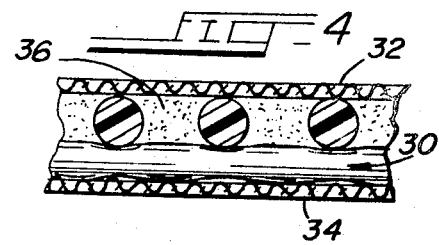
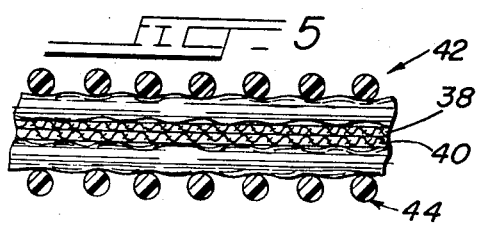
INVENTOR.
HENRY SCHMIDT, JR.

FILTER CONSTRUCTION

This invention is concerned with liquid filters. More particularly, it relates to a new and improved filter tube and a filter medium comprising a semirigid grid member which is bonded throughout its surface area to a porous, nonwoven fabric to provide a unified semirigid structure of controlled porosity.

Nonwoven fabrics, such, for example, as that sold by E. I. du Pont de Nemours & Co. under the name "Reemay" is a spun bonded polyester having many advantages over other materials for removing entrained solids from a liquid passing through it. Among these advantages are uniformity of porosity, low pressure drop, and good cleanability. In spite of these advantages, however, nonwoven fabrics have not been extensively used in the filter industry because of their relatively limp nature, particularly when they are wet. Attempts to overcome this disadvantage have not met with much success. For example, such materials have been stiffened and strengthened by impregnating the fabric with a stiffening resin but the cost of this process is extremely great and the impregnated fabric cannot be readily pleated for use in the pleated type tubular filter. Another prior art attempt to strengthen the fabric employs an apertured backing member which forms part of the filter element, such as a leaf or tube, and against which the fabric is loosely positioned. Such an arrangement cannot be backwashed and the differences in the expansion and contraction of the support member and of the fabric during use and the looseness of the medium causes other problems well known to those skilled in the art.

One important application where the advantageous characteristics of nonwoven fabric would be particularly useful is in the pleated type tubular filter. Filter paper is commonly used in this type of filter but it has several disadvantages including nonreusability, susceptibility to substantial changes in shape or geometry during use, and tearing. Therefore, it would be desirable to provide a filter medium including a nonwoven fabric, which medium could be used in the pleated type filter tube.

A principal object of the present invention is, therefore, to provide a new and improved filter medium.

Another object of this invention is to provide a filter medium incorporating a nonwoven fabric.

A further object of this invention is to provide a novel tubular filter employing a nonwoven fabric. Briefly, the above and further objects may be realized in accordance with the present invention by providing a filter medium having a semirigid plastic grid or netting secured throughout its surface area to a thin, nonwoven fabric sheet. Preferably, the grid is a netting of thermoplastic and the fabric is heat-sealed thereto by placing a sheet of fabric on a sheet of netting and passing the two sheets between calendar rollers. One of the rollers is heated to melt the netting only where it engages the fabric thereby to provide a unitary, integral filter medium.

This filter medium can be pleated by selectively heating the netting at the desired locations of the folds and then bending the medium into the desired shape so that when cooled the medium retains its pleated configuration or geometry so long as its temperature is maintained below a predetermined value near the melting point. When used in a tubular filter, the netting provides good back drainage and, in addition, eliminates the need for a central support tube as is normally required in this type of filter.

In another embodiment of this invention, the thermoplastic netting is interposed and bonded throughout its surface area to two sheets of porous material, at least one of which is a nonwoven fabric. The interstices in the netting contain a chemically active particulate material such as an ion exchange resin which is held in place by the two sheets, whereby the filter medium may also function as an active element in the system in which is used.

Further objects and advantages and a better understanding of the invention may be had from the following detailed description taken in connection with the accompanying drawing, wherein:

FIG. 1 is a perspective view of a portion of a new filter medium embodying the present invention, certain portions thereof being removed to facilitate an understanding of the construction thereof;

FIG. 2 is a perspective view of a pleated type filter tube embodying the present invention;

FIG. 3 is a cross-sectional view of the tube of FIG. 2 taken along the line 3–3 thereof;

FIG. 4 is a cross-sectional view of another filter medium embodying the present invention; and FIG. 5 is a cross-sectional view of yet another filter medium embodying the present invention.

Referring now to FIG. 1, there is shown a small section of a sheet of filter material embodying the present invention. This filter medium is identified by the reference numeral 10 and consists of a sheet of plastic netting 12 bonded to a thin sheet of nonwoven fabric 14. The netting 12 is formed of an extruded thermoplastic such as polyethylene, polypropylene or polycarbonate and consists of a plurality of rods or filaments 16 which are integrally united at the points of intersection with a plurality of transverse filaments or rods 18. One material of this type is sold by E. I. du Pont de Nemours & Co. under the trademark Vexar and is formed in a continuous extruding process whereby the filaments 16 and 18 are continuous and are integrally united at the crossover points. The nonwoven fabric may be formed of natural fibers such as cotton, or it may be formed of synthetic fibers as, for example, a polyester. It can also be a thin sheet of a sintered plastic such as high density, linear polyethylene. Inasmuch as the sheet 14 is physically supported by the netting 12 and forms a unitary structure therewith, it may be extremely thin as, for example, 6 to 10 mills in thickness thereby minimizing the pressure drop which is developed across it during use as filter medium. Preferably, the netting 12 is heat-sealed to the sheet 14 by passing the sheet of netting 12 and a superimposed sheet 14 through calendar rollers, the roller which engages the sheet 14 being relatively soft and heated to a temperature exceeding the melting point of the material from which the netting is formed, and the other roll being hard and unheated. Consequently, heat is transmitted through the nonwoven sheet 14 to the locations where it engages the netting 16 thereby to selectively melt the netting at these locations to form a thermomechanical bond with the fibers of the sheet 14. Where the sheet 14 is also a thermoplastic, it preferably has a melting point exceeding that of the netting and the temperature of the heated calendar roll.

The filter medium 10 is semirigid so that it may be bent and held in a desired shape or it may be used as a flat member in, for example, a filter leaf construction. The netting 12 provides an integral back drainage member which maintains the sheet 14 in spaced apart relationship from a supporting surface or from another sheet of the same material should they be used in back-to-back relationship. Because of the bond between the netting 12 and the sheet 14, the medium can be backwashed by passing a liquid therethrough from the rearward or netting side of the medium. The cleanability advantage of the nonwoven fabric 14 is thereby retained.

As described hereinabove, one of the important uses of the filter medium 10 is in a pleated type tubular filter. Such a filter is shown in FIGS. 2 and 3 and comprises a sheet of the filter medium 10 which is folded into axially extending pleats with the netting 12 on the downstream side of the filter as best shown in FIG. 3. A pair of end caps 20 and 22, which are preferably formed of a thermosetting plastic such as an epoxy, may be potted directly over the top and bottom ends of the pleated tube to complete the filter. Where the nonwoven fabric 14 is thermoplastic it will be seen that the entire tube is formed of plastic so that the problems and expense normally associated with metal are avoided.

Referring to FIG. 3, it may be seen that the pleats 24 are provided by alternately disposed outer folds 26 and inner folds 28 with the radius of the outer folds being substantially smaller than the radius of the inner folds 28. The radius of the inner folds is selected such that the pleats fit tightly together at the inner diameter of the tube. In this manner, the geometry of the pleated filter medium is retained during use when the filter is subjected to substantial hydraulic forces. Moreover, the netting 12 at the locations of the inner folds 28 defines a strong tubular or cylindrical configuration so that no additional support tube is required in that area. In prior art pleated tube filters, a perforated tube was normally required to maintain the pleated filter medium in place. The present tubular construction permits elimination of the separate inner tube with a consequent reduction in the manufacturing cost thereof. Since the filter medium retains its shape during use so that the separate folds 24 do not move into contacting relationship with the adjacent fold, as is commonly the case with paper filters, the tube can be easily and quickly cleaned by spraying it with water or some other liquid.

Referring to FIG. 4, there is shown in cross section a filter medium comprising a plastic netting 30 to which is bonded a sheet 32 of a nonwoven fabric. Another porous sheet 34 is bonded to the opposite side of the netting 30. The sheets 32 and 34 are, of course, both porous and a particulate chemically active material 36 is disposed in the interstices of the netting 30 between the sheets 32 and 34. This material 36 may be an ion exchange resin which reacts with the liquid being passed through the filter medium. In the past, it has been the practice in some processes to use such a resin as a precoat but by necessity the resin is lost since the cost of separating it from a filter cake material is excessive. By locating the resin within the filter medium so that it is held in place by the sheets 32 and 34 the filter cake can be removed from the filter medium without loss of the resin which may be thereafter regenerated in place within the medium.

Referring to FIG. 5, there is shown another embodiment of the present invention wherein a pair of thin porous sheets 38 and 40 are held in face-to-face relationship between a pair of thermoplastic nettings 42 and 44. In this filter medium configuration, two sheets of the filter medium such as that shown in FIG. 1 are positioned back-to-Back in a supporting structure. One of the sheets 38 or 40 may be an activated fabric normally called a chelating fabric wherein a chemically active material is held within the interstices of the fabric. Chelating fabrics are known in the filter industry but the mounting thereof has in the past presented a problem. By bonding such a fabric to the thermoplastic netting, the materials may be reused since it can be readily cleaned, backwashed and regenerated.

As indicated hereinabove, it is preferable that the netting be thermally bonded to the nonwoven fabric but for some applications other methods of bonding such as by the use of a cement or stitching may be used.

While the present invention has been described in connection with particular embodiments thereof, it will be understood that those skilled in the art may make many changes and modifications without departing from the true spirit and scope of this invention. Therefore, it is intended by the appended claims to cover all such changes and modifications which fall within the true spirit and scope of the invention.

I claim:

1. A filter medium comprising a thin sheet of nonwoven fabric and a grid formed of a semirigid thermoplastic material overlying said fabric, said grid being formed of fabric engaging elongated members and cross-connecting elongated members connected to said fabric engaging members at the intersections thereof, said fabric-engaging elongated members being bonded throughout their length to said fabric thereby to provide an integral structure.

2. A filter media according to claim 1 wherein said semirigid plastic consists of one of the group of polypropylene, polyethylene and polycarbonate.

3. A filter media according to claim 1 further comprising a second sheet of a nonwoven fabric overlying said grid on the side opposite the first sheet and bonded to said grid throughout the surface area of said grid.

4. A filter media according to claim 3 further comprising a powdered reaction material held in the interstices of said grid between said sheets of fabric.

5. A filter media according to claim 4 wherein said reaction material is a surface active agent.

6. A filter media according to claim 4 wherein said reaction material is an ion exchange resin.

7. A tubular filter element comprising:
a sheet of filter medium formed into a tubular shape and having axially extending pleats formed by outer and inner folds, a grid being disposed on the inner side of said tube; and
said filter medium comprising a thin sheet of nonwoven fabric and a grid formed of a semirigid thermoplastic material overlying said fabric, said grid being formed of fabric-engaging elongated members and cross-connecting elongated members connected to said fabric-engaging members at the intersections thereof, said fabric-engaging elongated members being bonded throughout their length to said fabric thereby to provide an integral structure.

8. A tubular filter element according to claim 7 wherein said inner folds have a substantially greater radius that that of said outer folds with the adjoining grid surfaces of said material being in substantial contact throughout the pleated portions.

9. A tubular filter element according to claim 8 further comprising plastic end caps bonded to the ends of said tube with at least one of said caps having a central hole opening into the center of said tube.